United States Patent [19]

Eserhaut et al.

[11] Patent Number: 4,457,716

[45] Date of Patent: Jul. 3, 1984

[54] PERFORMANCE MONITOR SYSTEM FOR AIRCRAFT SIMULATOR

[75] Inventors: Eldon D. Eserhaut, Lancaster, Calif.; Donald E. Gutridge; Ray F. Nally, both of Phoenix, Ariz.; Adolph P. Stumpf, Litchfield Park, Ariz.

[73] Assignee: The Singer Company, Binghamton, N.Y.

[21] Appl. No.: 283,411

[22] Filed: Jul. 15, 1981

[51] Int. Cl.³ .............................................. G09B 9/08
[52] U.S. Cl. ..................................... 434/43; 358/104; 434/20
[58] Field of Search .................... 434/43, 32, 34, 29, 434/14, 20; 358/104

[56] References Cited

U.S. PATENT DOCUMENTS 3,720,007 3/1973 McKechnie et al. ................ 434/43
4,001,499 1/1977 Dowell ................................. 434/43
4,106,218 8/1978 Polstorff ............................. 434/34

Primary Examiner—Vance Y. Hum
Assistant Examiner—Leo P. Picard
Attorney, Agent, or Firm—Douglas M. Clarkson; Jeff Rothenberg

[57] ABSTRACT

In an optical sight display for a fighter aircraft pilot training simulator, a performance monitor system is described as having a visual display for providing a pictorial representation (10) to a trainee's eye view (11) of real-time information. Electronic apparatus (31) such as a TV camera generates electrical signals responsive to visual images developed on a combining glass (13), and by means of a particularly described optical arrangement (lens 24, 27 & 30) when used with a fiber-optic bundle (29), the camera (31) is positioned remotely, out of the trainee's normal field-of-view. Due to the limited space in a fighter aircraft, this disclosed arrangement of component parts permit the generation of a substantially duplicate pictorial representation at an instructor's station for monitoring the performance of a trainee.

9 Claims, 4 Drawing Figures

PERFORMANCE MONITOR SYSTEM FOR AIRCRAFT SIMULATOR

BACKGROUND OF THE INVENTION

This invention, generally, relates to simulators of aircraft with visual display systems and, more particularly, to a new and improved performance monitor system for use in such simulator.

In previous aircraft simulator systems, an instructor's station was not able to view the same target and aiming scene or display that a pilot trainee viewed. For example, in an instance where a gunsight is superimposed on a target as viewed by a pilot, the only image visible at the instructor's station is one or the other, i.e., the gunsight or the target, but not both. One reason for this is that the limited space within the cockpit of a fighter plane does not permit sufficiently elaborate equipment for two people to view the target through the gunsight.

Such previous systems, therefore, were seriously limited in instructional value in that the instructor could not give as valid instructions as he would have been able to give had he been able to see the combined display visible to the pilot trainee. Such instructional limitations extended to both current or real-time instructions (those that could be given during the training exercise) and to later debriefing discussions.

OBJECTS AND SUMMARY

Accordingly, it is a principal object of the invention to provide a new and improved performance monitor system that permits a remote view at an instructor's station of the combined display as viewed by the pilot trainee.

It is also an object of the invention to provide an instructor's station where all that the pilot trainee sees is made available also to the instructor's station.

It is another object of the invention to provide a substantially improved performance monitor system for an optical sight display which can be used in a fighter aircraft pilot training simulator.

Still another object of the invention is the provision of an optical sight display for use in a fighter aircraft pilot training simulator wherein both the gunsight video and the target display are available at an instructor's station.

Accordingly, a performance monitor system for an optical sight display, which is constructed in accordance with the principles of the present invention, is adapted for use in a fighter aircraft pilot training simulator which has a visual display to provide a pictorial representation to a trainee. Suitable electronic equipment, such as for example, a television camera, generate electrical signals responsive to the visual images as seen by the pilot trainee. This electronic equipment is positioned out of the trainee's line-of-sight, and suitable optical means, such as for example, a fiber optical light guide, effectively connects visual images, as seen by said trainee, to the electronic equipment so that substantially all of the pictorial representation is visible to both the trainee and to the electronic equipment.

Other objects, aspects and advantages of the invention will in part be pointed out in, and in part from, the following detailed description, considered together with the accompanying drawings.

THE DRAWINGS

The exact nature of the invention as well as other and further objects, features and advantages thereof will be more readily apparent from consideration of the following detailed description relating to the accompanying drawings, in which.

DETAILED DESCRIPTION

Figure 1:
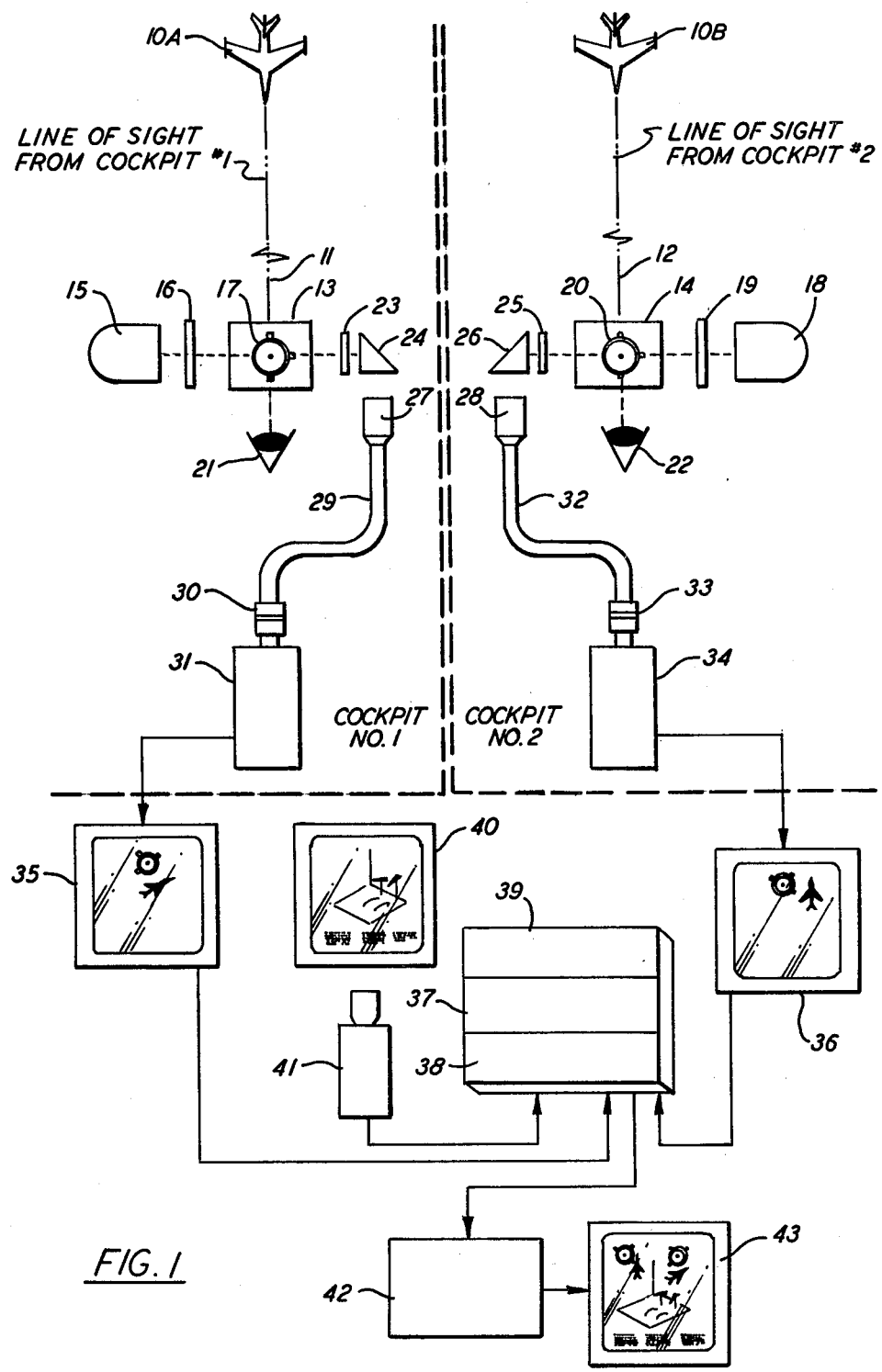
FIG. 1 is a system of component parts, illustrated partly diagrammatically and partly pictorially, in order to illustrate the interrelationship of such parts in accordance with the present invention.

Throughout the accompanying figures of the drawings, the same reference numerals are used to identify the same or similar component parts.

Referring now to FIG. 1 of the drawings, the numerals 10A and 10B identify a single target which may be viewed by a pilot trainee (not shown) along a line-of-sight 11 in cockpit No. 1 as well as along a line-of-sight 12 by a pilot trainee (not shown) in another cockpit No. 2. Interposed in the line-of-sight 11 is a combining glass 13, and a similar combining glass 14 is positioned in the line-of-sight 12.

A projector 15 is mounted within the cockpit (not shown) in order to project through a polarizer lens 16 a gunsight reticle 17 on the combining glass 13 in a lead computing or fixed position, and a similar projector 18 is mounted in order to project through a similar polarizer lens 19 a similar gunsight reticle 20 in a lead computing or fixed position on the combining glass 14.

An eyepoint 21 illustrates the approximate relative position of a pilot trainee's viewpoint along the line-of-sight 11, and an eyepoint 22 shows a similar position along the line-of-sight 12. A pilot trainee at the eyepoint 21 will have a clear view of the target 10A along the line-of-sight 11 through the gunsight reticle 17, and a pilot trainee at the eyepoint 22 will have a clear view of the other target 10B through the gunsight reticle 20 along the line-of-sight 12.

Such a target 10A or 10B is projected by any one of several aircraft image generator systems well known in the art, along with any suitable terrain background information from a suitable simulated-terrain generator, also well known in the art. The targets 10A and 10B can be actual photographs projected onto suitable screens or other surfaces, or they may be images projected from a computer image generator, both systems being well known in the art and the details of which form no part of the present invention.

In accordance with the present invention, a system is connected to generate an image at an Instructor's Station duplicating target and gunsight aiming point relationship that is visible to the pilot trainee. An Instructor at such station, therefore, is able to give more valid instructions to the trainee during the training exercise.

Heretofore, such systems were capable only of exhibiting partial views, such as, the gunsight or the target, but not both. However, in accordance with the invention, it is all tied together in one scene for more contemporaneous action by both Instructor and trainee.

An analyzer lens 23, together with a 90° optical prism 24, is positioned relative to the combining glass 13 so that not only is the gunsight reticle 17 visible but also the target 10A, and a similar analyzer lens 25, together with an accompanying 90° optical prism 26, is positioned relative to the combining glass 14 so that the gunsight reticle 20 is clearly visible along with the image of the target 10B. Positioned contiguously with the prism 24 is a camera pick-up lens 27, and a similar camera pick-up lens 28 is positioned contiguously with the prism 26.

A fiber-optic bundle 29 is connected as a flexible transmission line for the image from the camera pick-up lens 27 through a relay lens 30 to a low light level camera 31, and a similar fiber-optic bundle 32 connects the images flexibly from the camera pick-up lens 28 through a relay lens 33 to a low light level camera 34.

The electrical signals which are generated by the cameras 31 and 34 are displayed on a suitable Cathode Ray Tube (CRT) monitor 35 and 36, respectively. Both of these CRT monitors 35 and 36 are positioned at an Instructor's Station.

The CRT monitors 35 and 36, therefore, permit the Instructor to have a pictorial view of target and gunsight aiming point relationship that the trainee sees in each respective cockpit. Therefore, the Instructor can relate instructions to each trainee at the time in his training which might be the most helpful in the learning process.

However, to make a record of a training event, an arrangement of the component parts described above, together with a suitable video recording system, permits a permanent record to be made.

The electrical signals that are connected to the respective video monitors 35 and 36 are connected also to a sync generator circuit 37, a sync delay circuit 38, and an Effects Generator circuit 39.

The sync delay circuit 38 has connected with it the Effects Generator circuit 39 so that the position of the two pictorial representations formed on the CRT monitors 35 and 36 can be adjusted in position in order to move them to the left or to the right, up or down, in order to show a split image of both views on a single, composite video signal for recording.

A CRT monitor 40 is used at the Instructor's Station to illustrate a computer-generated graphics display of the relative target positions. Also on the CRT monitor 40 are words, numbers or symbols, as usually provided in a simulator training apparatus, to indicate such information as altitude, distance apart, attitude, amount of G's, angle of attack, speed of closing, and etc.

Suitable electronic means, such as a camera 41, is positioned to generate electrical signals responsive to the visual images on the CRT monitor 40 and to connect such signals to the Effects Generator circuit 39, as described above. The electrical signals connected to the Effects Generator circuit 39 and sync delay circuit 38 are recorded on a suitable video tape recorder 42 for later playback. The CRT monitor 43 provides a display of the recording process. The recording of the composite video scene made of a trainee's performance may be used for various purposes, such as debriefing or further instructive value.

Figure 2:
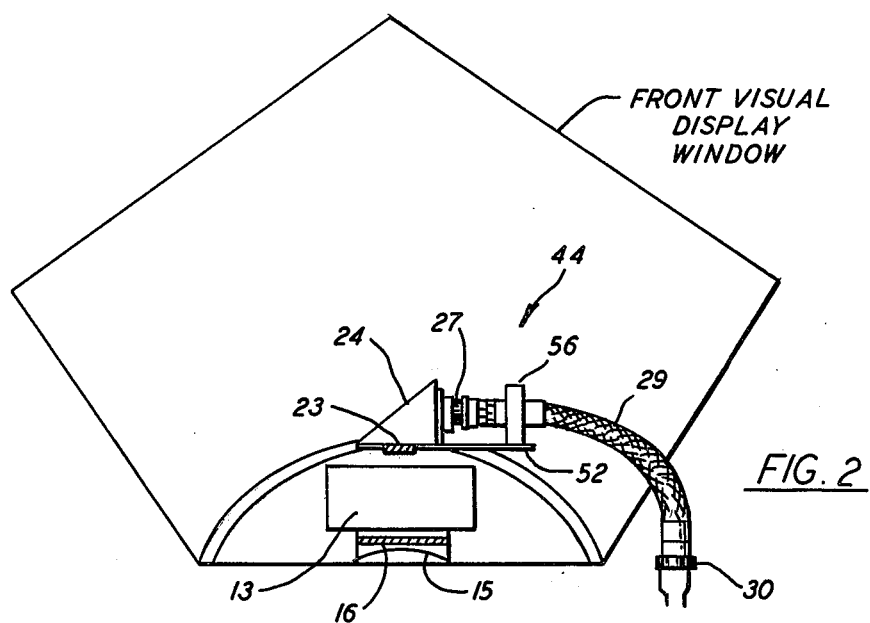
FIG. 2 is a front view of the assembled component parts in accordance with the invention.
Figure 3:
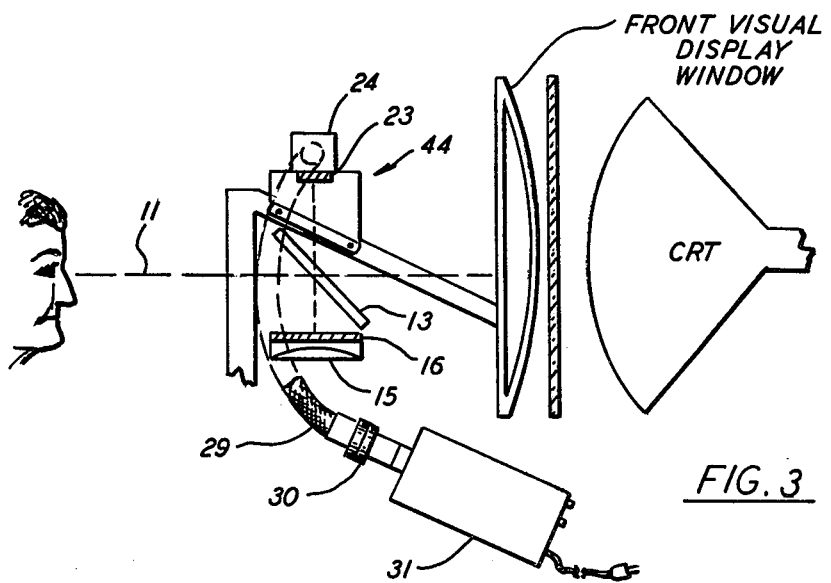
FIG. 3 is a side view of FIG. 2 in order to show the component parts in elevation.

Referring now to FIG's 2 and 3 of the drawings, FIG. 2 shows the arrangement looking forward. FIG. 3 is a side view, in elevation, of the same view as shown in FIG. 2. For example, the line-of-sight 11 in FIG. 3 through the combining glass 13 would be perpendicular to the paper as viewed in FIG. 2.

The gunsight reticle projector 15 (FIG. 1) is positioned beneath the combining glass 13 projecting upwardly through the polarizer lens 16. In this way, the gunsight reticle 17 is projected onto the combining glass 13 to be visible by the trainee along the line-of-sight 11, but such reticle 17 also is visible above the combining glass 13 through the analyzer lens 23, through the pick-up lens 27 and by the camera 31, all the way to the Instructor's monitor 35, as discussed in connection with FIG. 1.

Having the performance monitor system just described above, there will now be described a unique support 44 for mounting some of the more critical component parts.

Figure 4:
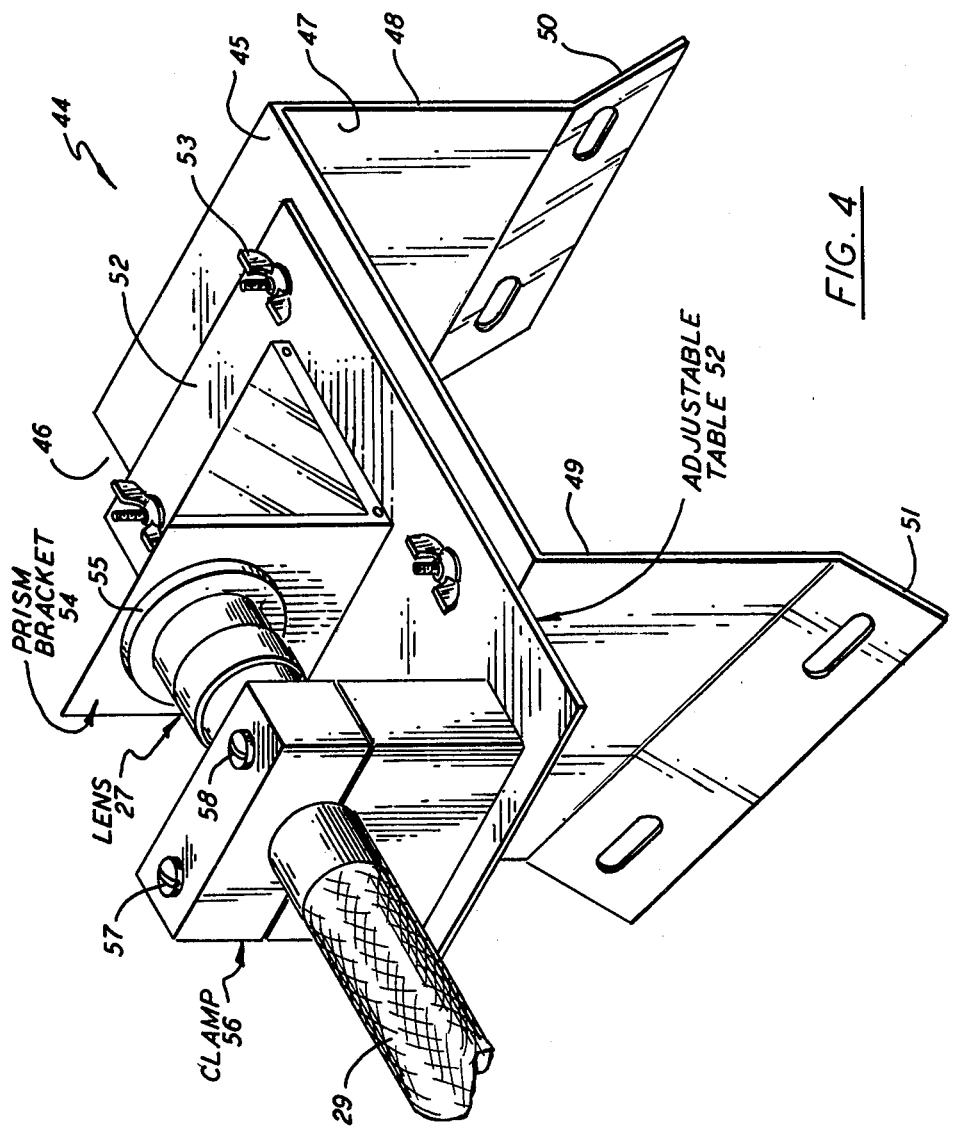
FIG. 4 is a perspective view of an adjustable table to achieve some of the more critical adjustments in order to align mechanically the component parts of the invention.

Referring now to FIG. 4 of the drawings, the reference numeral 44 identifies the entire mount system, and it consists of a substantially horizontal surface 45. The mount system 44 is open at opposite ends 46 and 47, respectively, but the surface 45 terminates at its intermediate ends in substantially vertical surfaces 48 and 49. The substantially vertical surface 48 ends at its lowermost end in a slightly flared end 50. The lowermost end of the substantially vertical surface 49 is slightly flared at 51 to match the end 50. The flared ends 50 and 51 mate with the cockpit framework and canopy support system.

Whereas the substantially horizontal surface 45 is relatively fixed when mounted on the cockpit framework, an upper table 52 is supported adjustably by the surface 45. Several wingnuts, one of which is identified by the reference numeral 53, are used to removably attach the adjustable table 52 to the substantially horizontal surface 45.

A prism support bracket 54 is shown to fixedly position the prism 24 onto the adjustable table 52, and the camera pick-up lens 27 is supported in a fixed position relative to the prism 24 by a fixed ring 55 at one end, and the lens 27 is fixedly attached to the table 52 at its opposite end by a locking clamp 56, which also serves to clamp and secure one end of the fiber-optic bundle 29.

The cockpit prism mount 44 is bolted to the cockpit windscreen frame and canopy support system (not shown). The adjustable table 52 of the mount 44 may be tilted as necessary to position the prism to allow the gunsight reticle to be centered in the camera 31. A similar mount is located in cockpit No. 2.

The fiber-optic locking clamp 56 is used to secure the fiber-optic bundle after video aperture alignment and to adjust the position of the lens-prism interface to allow a distance setting of the camera lens 27. A polarized analyzer filter 23 is located just below the prism 24. The analyzer 23 may be rotated to adjust the quality of the combined pictorial representation viewed by the Instructor.

Note that with the two screw 57 and 58 loosened on the clamp 56, the end of the fiber-optic bundle 29 may be adjusted in position by moving it further within the clamp 56 or by pulling it further out of the clamp. This movement will permit adjustment of the focus.

Further, by rotating the end of the fiber-optic bundle 29, with the screws 57 and 58 loosened, the vertical orientation of the image at the Instructor's Station CRT monitor 35 is adjustably oriented also. With the image in the desired vertical orientation and focus, the screws 57 and 58 are tightened securely.

Although a preferred form of the invention has been described in detail, it is desired to point out that this is for the purpose of illustrating the principles of the invention only. In view of such illustration, therefore, other modifications, variations, advantages and uses will occur to one skilled in this art. Accordingly, the invention and all such modifications are to be considered as illustrative only, the true spirit and scope of the invention being that defined by the appended claims.

We claim:

1. A performance monitor system for an optical sight display in a fighter aircraft pilot training simulator, comprising:

visual display means for providing a pictorial representation, including a target, to a trainee pilot's line-of-sight in a view of real-time information in said training simulator;

projector means, positioned out of said trainee pilot's line-of-sight, to project a gunsight reticle toward said trainee pilot's line-of-sight;

combining glass means to produce to said trainee pilot a view of said pictorial representations as seen through said gunsight reticle;

an electronic camera means positioned remotely relative to said trainee pilot's line-of-sight;

optical means located out of a trainee's normal field-of-view so that said view as seen by said trainee pilot through said projected gunsight reticle is visible to both said trainee pilot and to said remotely positioned electronic camera means;

said optical means includes prism lens means located in a predetermined relationship relative to said combining glass means to produce a duplicate view of said view as seen by said trainee pilot through said gunsight reticle;

bundles of flexible fiber-optic means to convey said duplicate image of said trainee pilot's view to said remotely positioned electronic camera means;

camera pick-up lens means positioned between said prism lens means and one end of said bundles of fiber-optic means;

relay lens means positioned between the opposite end of said bundles of fiber-optic means that from said one end and said remotely positioned electronic camera means; and means to adjust the physical position of said optical means relative to said combining glass means to locate and to orient said prism lens means in a predetermined manner relative to said combining glass means;

whereby electrical signals generated by said electronic camera means are available to produce a duplicate pictorial representation for monitoring the performance of a trainee pilot and so that an instructor can see the same view that the trainee pilot sees through the gunsight reticle.

2. A performance monitor system of claims 1 including cathode ray tube monitor means connected to receive the electrical signals generated by said electronic means.

3. A performance monitor system of claim 1 including computer generated graphic display means to produce visually information responsive to predetermined aspects of said simulator.

4. A performance monitor system of claim 1 including camera means to record said visually produced information.

5. A performance monitor system of claim 4 wherein said camera means is in the form of an electronic video camera.

6. A performance monitor system of claim 5 including circuit means to combine said visually produced information with said visual images determined by said pictorial representations on another cathode ray tube monitor.

7. A performance monitor system of claim 5 including video tape recorder means connected to make a record of said visually produced information produced by said video camera and said visual images generated by said electronic means.

8. A performance monitor system of claim 1 wherein said means to adjust includes a fixed-position support, and table means adjustable in position relative to said support.

9. A performance monitor system of claim 8 wherein said fixed-position support includes a substantially flat surface attached at opposite ends to members extending at an angle for mounting in a predetermined fixed location within said fighter aircraft simulator.

* * * * *

UNITED STATES PATENT AND TRADEMARK OFFICE
CERTIFICATE OF CORRECTION

PATENT NO. : 4,457,716
DATED : July 3, 1984
INVENTOR(S) : Eserhaut, Gutridge, Nally & Stumpf It is certified that error appears in the above-identified patent and that said Letters Patent are hereby corrected as shown below:

On the title page;

The name of the third inventor should read as follows:

-- RAY F. McNALLY --.

Signed and Sealed this

First Day of October 1985

[SEAL]

Attest:

DONALD J. QUIGG

Attesting Officer

Commissioner of Patents and
Trademarks—Designate